(12) United States Patent
Hnilica-Maxwell

(10) Patent No.: US 7,231,298 B2
(45) Date of Patent: Jun. 12, 2007

(54) ENVIRONMENT DETECTION SYSTEM

(76) Inventor: Janiece R Hnilica-Maxwell, 1867 Clover Ridge Dr., Howell, MI (US) 48843

( * ) Notice: Subject to any disclaimer, the term of this patent is extended or adjusted under 35 U.S.C. 154(b) by 277 days.

(21) Appl. No.: 10/762,661

(22) Filed: Jan. 22, 2004

(65) Prior Publication Data
US 2005/0165551 A1 Jul. 28, 2005

(51) Int. Cl.
G01W 1/00 (2006.01)
G01D 18/00 (2006.01)

(52) U.S. Cl. .................................. 702/3; 702/85

(58) Field of Classification Search ................ 702/1–6, 702/20–26, 85; 374/104
See application file for complete search history.

(56) References Cited

U.S. PATENT DOCUMENTS

| | | | | |
|---|---|---|---|---|
| 4,372,692 A | * | 2/1983 | Thomae | 374/104 |
| 4,755,942 A | * | 7/1988 | Gardner et al. | 700/284 |
| 4,869,874 A | * | 9/1989 | Falat | 422/53 |
| 5,464,044 A | * | 11/1995 | Brinkerhoff | 137/78.3 |
| 5,621,669 A | * | 4/1997 | Bjornsson | 702/85 |
| 5,821,405 A | * | 10/1998 | Dickey et al. | 73/53.01 |
| 5,884,224 A | * | 3/1999 | McNabb et al. | 702/2 |
| 6,597,991 B1 | * | 7/2003 | Meron et al. | 702/3 |
| 6,972,677 B2 | * | 12/2005 | Coulthard | 340/531 |
| 2002/0183935 A1 | | 12/2002 | Skinner | 702/19 |
| 2003/0083819 A1 | | 5/2003 | Rooney et al. | 702/5 |

* cited by examiner

Primary Examiner—John Barlow
Assistant Examiner—Victor J. Taylor
(74) Attorney, Agent, or Firm—Harness, Dickey & Pierce, P.L.C.

(57) ABSTRACT

An environment detection device for detecting a plurality of environmental conditions comprising a housing unit. The housing unit contains a plurality of sensors, a battery, and a memory storage device. The housing unit further includes a circuit board electrically connected to the plurality of sensors, the battery, and the memory storage device. The plurality of sensors includes a sunlight intensity sensor, a timer, a temperature sensor, and a moisture sensor. Additionally, a method is provided for determining vegetation capable of thriving in certain environmental conditions. The method includes sensing the environmental conditions, storing the environmental conditions on a memory storage device, and downloading the environmental conditions to a database, wherein the database displays a list of vegetation capable of surviving in the plurality of environmental conditions.

19 Claims, 4 Drawing Sheets

ENVIRONMENT DETECTION SYSTEM

FIELD OF THE INVENTION

The present invention relates to an environment detection system. More specifically, the present invention relates to a method and apparatus for determining environmental conditions suitable for growing plant life.

BACKGROUND OF THE INVENTION

In the past, plant enthusiasts have relied on books or horticulturalists to know the environmental conditions in which certain plants could grow. These conditions include geographic location, the amount of sunlight, temperature, and the amount of moisture in the ground. Excluding the geographic location, these conditions change frequently. For example, the amount of sunlight and the temperature in an area changes as the season changes. Furthermore, both temperature and sunlight change as the day progresses. These frequent changes make monitoring the conditions of the planting location very difficult to do by inspection.

Not knowing the precise environmental conditions of a specific planting location can cause a few problems. First, the vegetation the planter chooses may not survive in the area. Second, if planted in the wrong area, some plants will overtake other vegetation growing in that area. Third, the planter can experience some frustration in having to constantly spend money trying to find the right plants for growing in a particular area.

These problems give rise to a much needed solution. An apparatus that is capable of accurately determining certain geographical conditions, and a method thereof, that would reduce the problems and frustration of planting vegetation in a specified area.

SUMMARY OF THE INVENTION

The present invention relates to an apparatus for detecting a plurality of environmental conditions utilizing a housing unit having a plurality of sensors, sensing, for example, sunlight, temperature, and moisture of an area to be landscaped. The housing unit further includes a battery and a memory storage device. A circuit board is electrically connected to the plurality of sensors, the battery, and the storage device, and is contained within the housing unit. The moisture sensor is provided in the form of a moisture probe. The moisture probe is physically connected to the housing unit, and electrically connected to the circuit board.

The present invention further relates to a method of determining vegetation capable of thriving in a plurality of environmental conditions, comprising the steps of sensing the plurality of environmental conditions with an environment detection apparatus, storing the plurality of environmental conditions on a memory storage device, and downloading the plurality of environmental conditions to a database, wherein the database displays a list of vegetation capable of surviving in the sensed environmental conditions.

Finally, the present invention relates to a control system for using an environment detection apparatus as an activation device for a sprinkler system comprising at least one sensor for determining at least one environmental condition, at least one logical operation producing an output to an actuator based on the at least one environmental condition, and the actuator activating the sprinkler system based on the output of the at least one logical operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
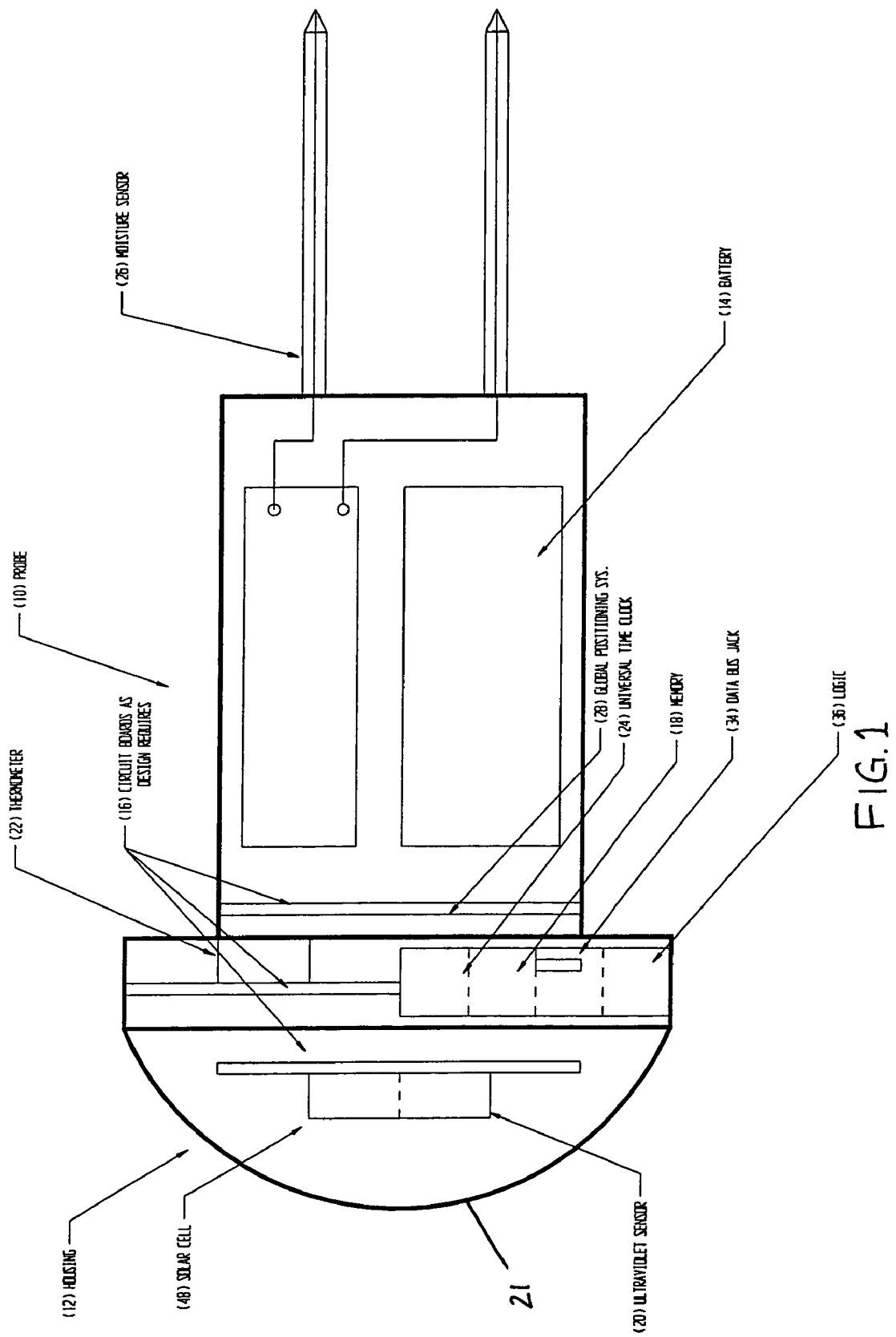
FIG. 1 is a plan view of a preferred embodiment of an environment detection apparatus constructed in accordance with the present invention.

FIG. 1 depicts an environment detection device 10. Environment detection device 10 reads various signals from various sensors based on the environmental conditions surrounding device 10. The sensors are contained within a housing unit 12. Additionally, housing unit 12 contains a battery 14, a circuit board 16, and a memory storage device 18 that is accessible in housing unit 12 by a user.

The first sensor in housing unit 12 is a light sensor, such as an ultraviolet sensor 20. Ultraviolet sensor 20 is placed in housing unit 12 in such a way that it is able to receive sunlight. For the preferred embodiment, housing unit 12 has a clear top portion 21, allowing light to travel to ultraviolet sensor 20. Furthermore, ultraviolet light sensor 20 is preferably positioned at the top of housing unit 12 to ensure that it can accurately register any amount of light in the area. Those skilled in the art recognize an ultraviolet sensor 20 is well known.

The next sensor is a temperature sensor, such as a digital thermometer 22 for detecting the temperature of the surrounding area. Additionally, a timer, such as a digital clock 24 interfaces with circuit board 16. Those skilled in the art recognize that thermometer 22 and clock 24 are well known, and widely used components.

The fourth sensor is a moisture probe 26. Moisture probe 26 measures the amount of conductivity in the ground. More moisture in the ground, for example, means more water in the ground. This lowers the electrical resistance of the ground, thus raising the ground's conductivity. Although the preferred embodiment shows two moisture probes 26, any number could be used depending on the size of the area being measured.

The sensors are connected to circuit board 16. Circuit board 16 processes the data received by the sensors by means of a microprocessor, and routes the information to a memory storage device (memory) 18. Memory 18 connects to device 10 through any number of different protocols, such as a universal serial bus (USB) connection, to allow easy removal and transfer to a computer. Many different memory storage devices 18 are available, including USB removable flash memory devices better known as jump drives to those skilled in the art.

Figure 5:
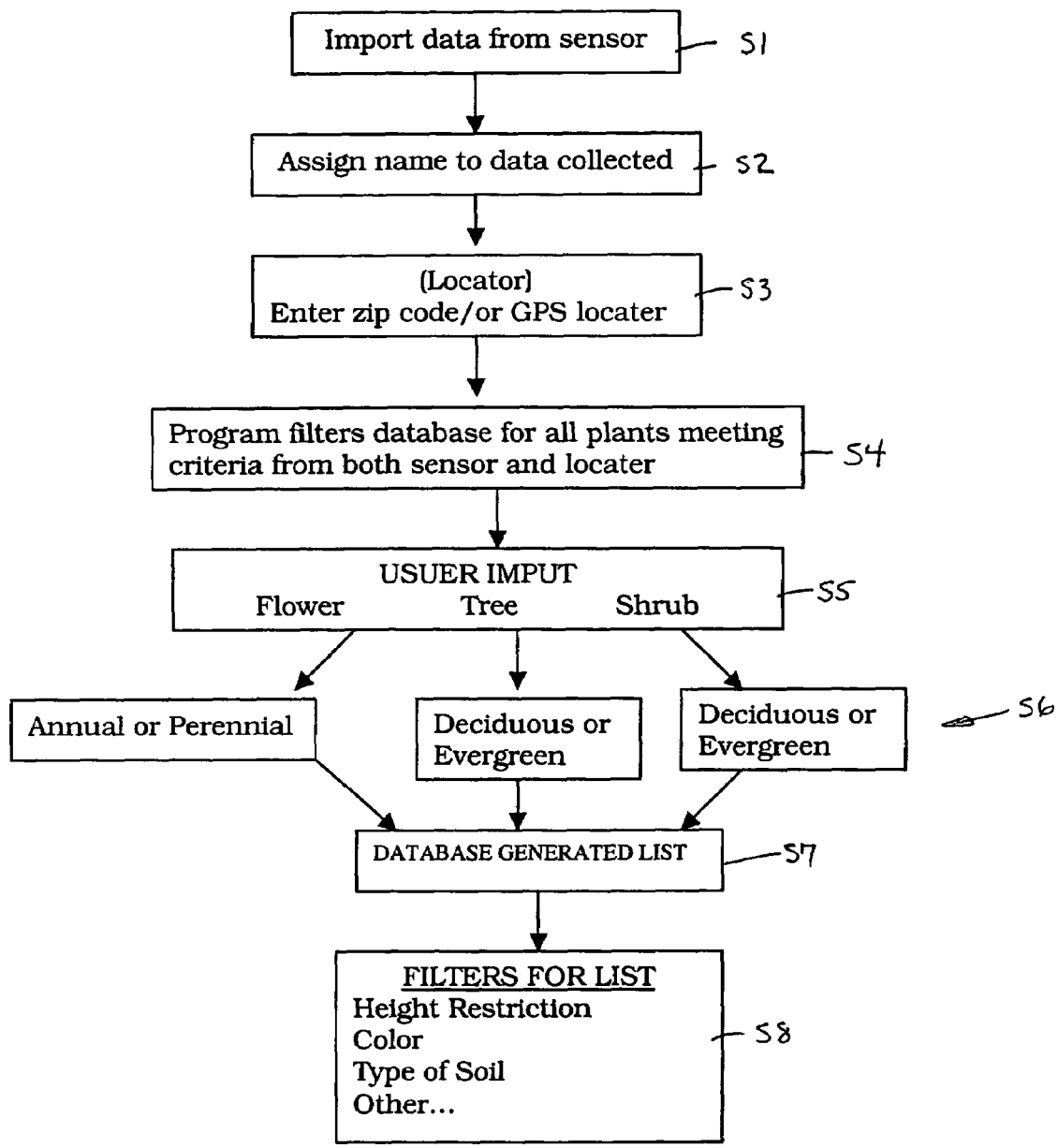
FIG. 5 is a flowchart showing a system for selecting landscaping vegetation in accordance with the present invention.

Once the data from the sensors has been acquired and downloaded to memory 18, the user removes memory 18 from device 10 and connects it to a computer. Alternatively, device 10 may contain a wireless transmitter to transmit the data from the sensors to a wireless receiver connected to a computer. Either method delivers the data collected by the sensors to a database on the computer at step S1 in FIG. 5. This processor prompts the user for various inputs, such as data group name S2 and geographic location S3. The processor then determines the plants meeting the sensed conditions (light, moisture, etc.) and geographic location. The user then inputs the general types of vegetation desired (e.g., plants, shrubs, trees (deciduous or evergreen), flowers (annuals or perennials) S5, SD. The database then analyzes the data recorded from the sensors to provide a list of vegetation that can thrive in those conditions S7. Other restrictions or parameters can be provided for limiting or narrowing down the list of vegetation, including height, width restrictions, color, type of soil, and other conditions.

According to another aspect of the present invention, the device 10 includes a global positioning satellite (GPS) system receiver 28 connected to circuit board 16 in addition to the other sensors. The benefit to using GPS system receiver 28 is that it is capable of determining the time, location, and temperature with decent accuracy. GPS receivers, in general, receive signals from a series of satellites orbiting the earth to acquire various data. Typically, GPS receivers are used to determine specific global coordinates, future weather forecasts, and any other information broadcast from the satellites. Additionally, many GPS receivers include on-board thermometers and clocks that operate similarly to those well known in the art. Therefore, GPS system receiver 28 may eliminate the user from having to input geographical location information into the database, as well as performing the function of the thermometer 22 and clock 24.

Figure 2:
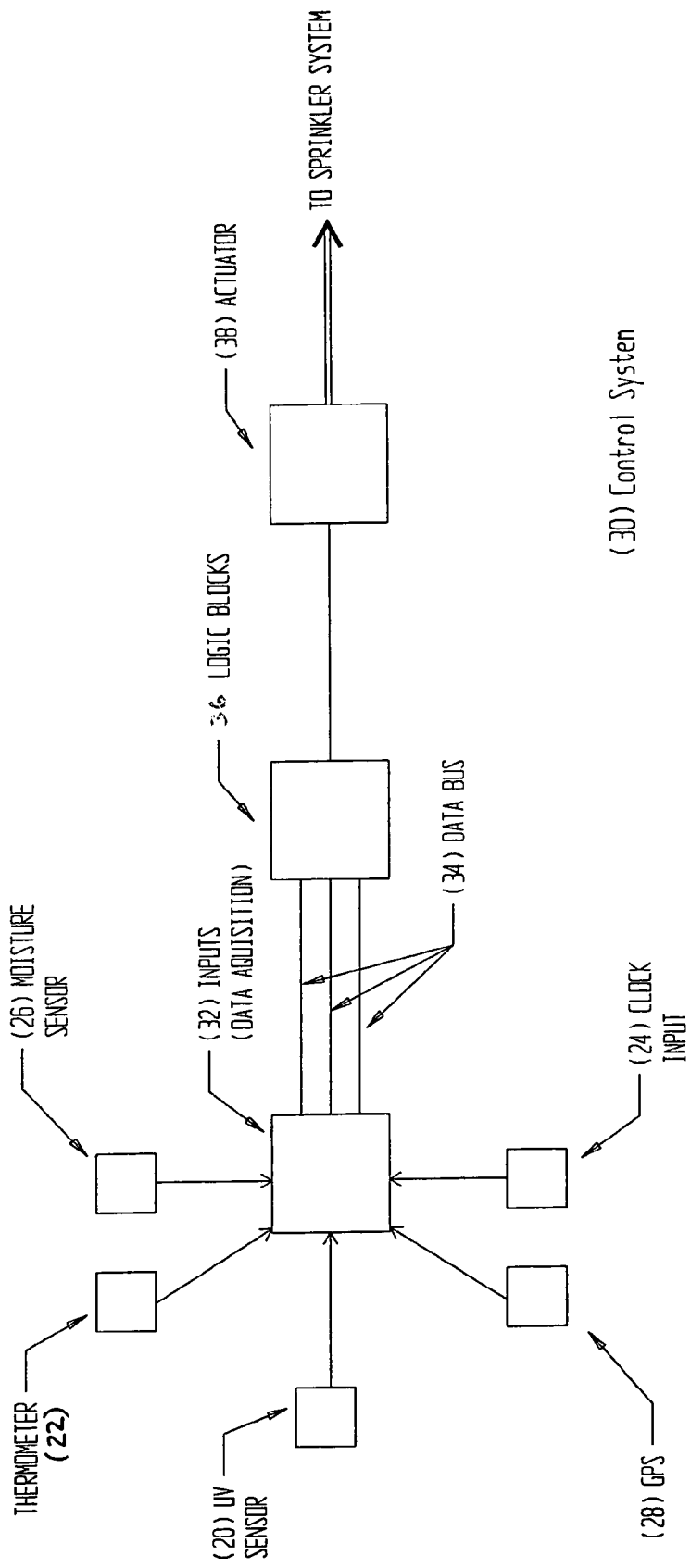
FIG. 2 is a plan view of an alternative embodiment of an environment detection apparatus constructed in accordance with the present invention.

Device 10 stores various data helpful in planting future vegetation, however, this data can also be useful for watering the vegetation after it has been planted. FIG. 2 shows a control system 30 using device 10 as means to actuate a sprinkler system.

First, the data collected from the sensors acts as inputs 32 to the control system 30. This data includes a sunlight intensity reading 20, a date and time reading 24, a temperature reading 22, and a moisture reading 26. These inputs travel along data lines 34 to the microprocessor on circuit board 16. The microprocessor analyzes the inputs 32 by using a series of "If/Then" logic statements 36 to determine if the vegetation needs to be watered. If the logic statements 36 determine watering is necessary, an output signal is sent to an actuator 38, which activates the sprinkler system.

Although thermometer 22 and clock 24 could be used as the sensors to collect the temperature and time reading, respectively, GPS system receiver 28 would be more beneficial in terms of device 10 actuating a sprinkler system. GPS system receiver 28 could determine the temperature and time, as well as receive future weather forecasts. This information would be useful when determining whether or not to water the vegetation. For example, if it is determined based upon the moisture reading that the vegetation needs to be watered, an "If/Then" logic statement 36 may be included that follows the following pattern: "if" the forecast equals "rain," "then" delay actuation of the sprinkler system. Other time constraint type "If"/"Then" logic statements 36 are implemented in case the forecast of "rain" is incorrect and therefore, the time constraint type "If"/"Then" logic statements 36 limit the amount of time that expires prior to watering of the vegetation. With this type of system, a more efficient sprinkler system is provided.

Figure 3:
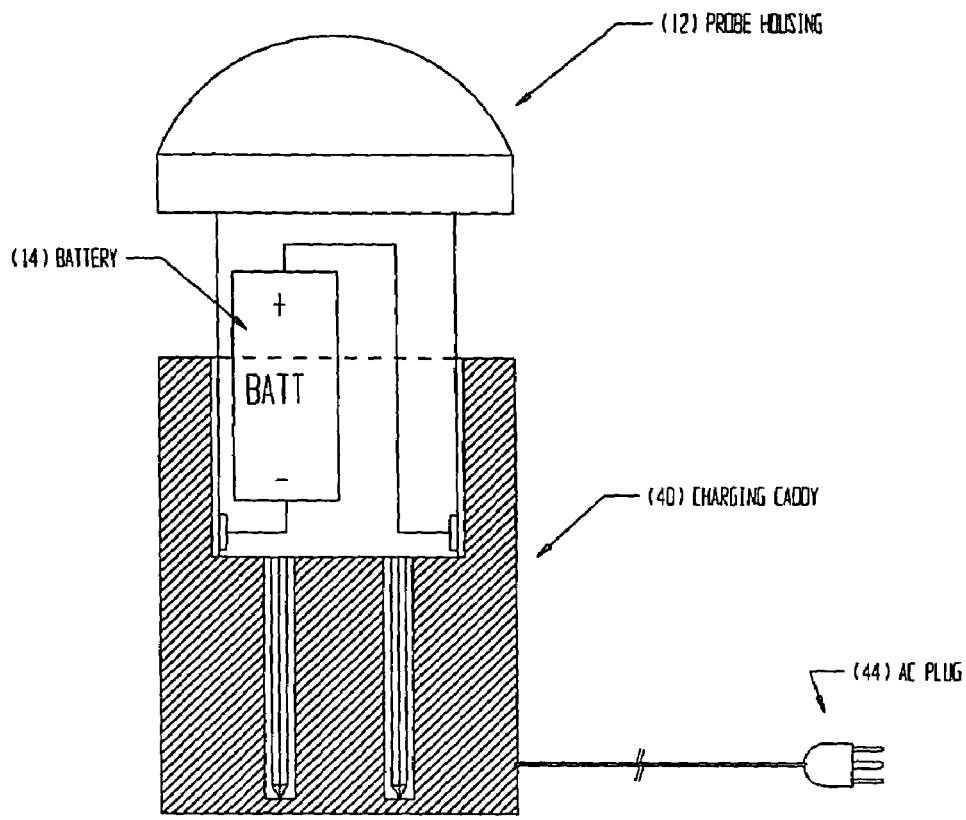
FIG. 3 is a schematic diagram of a control system of an environment detection apparatus constructed in accordance with the present invention.
Figure 4:
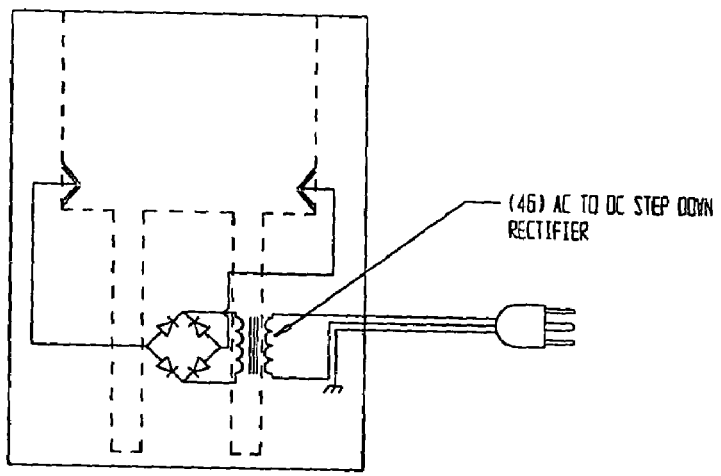
FIG. 4 is a plan view of an alternative embodiment of an environment detection apparatus constructed in accordance with the present invention.

Referring now to FIG. 3, device 10 is powered by either rechargeable or non-rechargeable batteries 14. For rechargeable batteries 14, device 10 employs a charging caddy 40 that connects to device 10 through moisture probes 26. Charging caddy 40 further connects to a wall outlet by means of a plug 44. As shown in FIG. 4, charging caddy 40 has a built in rectifier 46 to convert an AC voltage from wall outlet 42 to a DC voltage to charge batteries 14, as well as additional circuitry and components to charge the batteries, which is well known in the art.

Furthermore, device 10 may contain solar cells 48 to relieve a portion of the energy drain on batteries 14 while device 10 is located outside in sunlight. Solar cells 48 use sunlight to power device 10, relieving battery 14 of having to supply all the power. This allows device 10 to be placed outside for longer periods of time, thus allowing device 10 to collect more data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for detecting a plurality of environmental conditions comprising:
   a housing unit containing a light sensor;
   a memory storage device disposed in said housing unit;
   a circuit board electrically connected to said light sensor and the memory storage device, and contained within the housing unit, said memory storage device storing data from said light sensor; and
   at least one moisture probe physically connected to the housing unit, and electrically connected to the circuit board.

2. The apparatus of claim 1 wherein said housing unit contains a temperature sensor.

3. The apparatus of claim 1 wherein the housing unit further comprises an accessible compartment providing access to the memory storage device.

4. The apparatus of claim 1 wherein the memory storage device interfaces with the circuit board through a universal serial bus (USB).

5. The apparatus of claim 1 further comprising a global positioning satellite (GPS) system which provides geographic information.

6. The apparatus of claim 2 wherein the light sensor includes an ultraviolet sensor and the temperature sensor is a thermometer.

7. The apparatus of claim 1 further comprising a battery in the housing unit.

8. The apparatus of claim 7 further comprising a battery charger connectable to said housing unit to recharge the battery.

9. The apparatus of claim 7 further comprising at least one solar cell for recharging the battery.

10. A method of determining vegetation capable of thriving in a plurality of environmental conditions, comprising the steps of:

sensing the plurality of environmental conditions including sunlight intensity with an environment detection apparatus;

storing the plurality of sensed environmental conditions including sunlight intensity data on a memory storage device; and downloading the plurality of environmental conditions to a database, wherein a processor accesses data from the database and determines a list of vegetation capable of surviving in the plurality of stored environmental conditions, said processor then provides said list of vegetation to a display device for displaying said list of vegetation to a user.

11. The method of claim 10 wherein the plurality of environmental conditions further comprises a geographic locations a date and time reading, a temperature reading, and a moisture reading.

12. The method of claim 11 wherein at least one ultraviolet sensor determines the sunlight intensity reading, and at least one moisture probe determines the moisture reading.

13. The method of claim 12 wherein a global positioning satellite system determines the geographic location, the date and time reading, and the temperature reading.

14. The method of claim 12 wherein the user manually inputs the geographic location into the database, a timer determines the date and time reading, and a thermometer determines the temperature reading.

15. A control system for using an environment detection apparatus as an activation device for a sprinkler system comprising:

a sunlight intensity sensor for providing a sunlight intensity reading;

at least one logical operator producing an output to an actuator based on the sunlight intensity; and the actuator activating the sprinkler system based on the output of the at least one logical operator.

16. The control system of claim 15 wherein at least one ultraviolet sensor determines the sunlight intensity reading.

17. The control system of claim 15 further comprising a ground moisture sensor for providing a moisture reading for said logical operator.

18. The control system of claim 15 wherein the at least one environmental condition includes a weather forecast which is read from a remote device.

19. An apparatus for detecting a plurality of environmental conditions comprising:

a housing unit including a light sensor and a temperature sensor;

a memory storage device disposed in said housing unit for storing data from said light sensor and said temperature sensor;

a circuit board electrically connected to said first sensor and said memory storage device, and contained within said housing unit; and a second sensor including a moisture probe physically connected to said housing unit and electrically connected to said circuit board.

* * * * *

UNITED STATES PATENT AND TRADEMARK OFFICE
CERTIFICATE OF CORRECTION

PATENT NO. : 7,231,298 B2 Page 1 of 1
APPLICATION NO. : 10/762661
DATED : January 22, 2004
INVENTOR(S) : Janiece R. Hnilica-Maxwell It is certified that error appears in the above-identified patent and that said Letters Patent is hereby corrected as shown below:

Col. 4, line 4, please delete "If/Then" and insert --"If"/"Then"-- therefor.
Col. 4, line 7, please delete "If'/"Then" and insert --"If"/"Then"-- therefor.
Col. 4, line 9, please delete "If'/"Then" and insert --"If"/"Then"-- therefor.
Col. 5, line 19, claim 11, please delete "locations" and insert --location,-- therefor.

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,231,298 B2 | Page 1 of 1 |
| APPLICATION NO. | : 10/762661 | |
| DATED | : June 12, 2007 | |
| INVENTOR(S) | : Janiece R. Hnilica-Maxwell | |

It is certified that error appears in the above-identified patent and that said Letters Patent is hereby corrected as shown below:

Col. 4, line 4, please delete "If/Then" and insert --"If"/"Then"-- therefor.
Col. 4, line 7, please delete "If'/"Then" and insert --"If"/"Then"-- therefor.
Col. 4, line 9, please delete "If'/"Then" and insert --"If"/"Then"-- therefor.
Col. 5, line 19, claim 11, please delete "locations" and insert --location,-- therefor.

This certificate supersedes Certificate of Correction issued October 16, 2007.

Signed and Sealed this

Thirteenth Day of November, 2007

JON W. DUDAS
*Director of the United States Patent and Trademark Office*